UNITED STATES PATENT OFFICE.

JAMES K. DIAMOND, OF GRAND RAPIDS, MICHIGAN, ASSIGNOR TO CLIPPER BELT LACER COMPANY, OF GRAND RAPIDS, MICHIGAN, A CORPORATION OF MICHIGAN.

BELT-HOOK.

1,114,237.  Specification of Letters Patent.  Patented Oct. 20, 1914.

Application filed November 27, 1912. Serial No. 733,818.

*To all whom it may concern:*

Be it known that I, JAMES K. DIAMOND, a citizen of the United States, and resident of Grand Rapids, Kent county, Michigan, have invented certain new and useful Improvements in Belt-Hooks, of which the following is a specification.

This invention relates to certain new and useful improvements in belt hooks of that class in which double pointed hooks are employed for use upon opposite sides of the belt ends, and it has for its objects among others to provide a simple, yet efficient form of belt hook which will not in any way cut or injure the fabric or fiber of the belt and in which the points are so constructed and arranged as to firmly hold the belt ends so that it is practically impossible for the belts to fray at the ends even though the hooks have their points arranged rather close to the ends. The points are made chisel shaped with their ends slightly curved outwardly so as to cause them to clench as they press into the belt, and being thus clenched they keep the hooks from working out of the belt and also prevent their wearing out quicker than they otherwise would. This construction also keeps the strain where it should be, at the point of the turn, and prevents the hooks from pulling out.

Other objects and advantages of the invention will hereinafter appear and the novel features thereof will be particularly pointed out in the appended claim.

The invention, in its preferred form, is clearly illustrated in the accompanying drawings, which, with the numerals of reference marked thereon, form a part of this specification, and in which—

Figure 1:
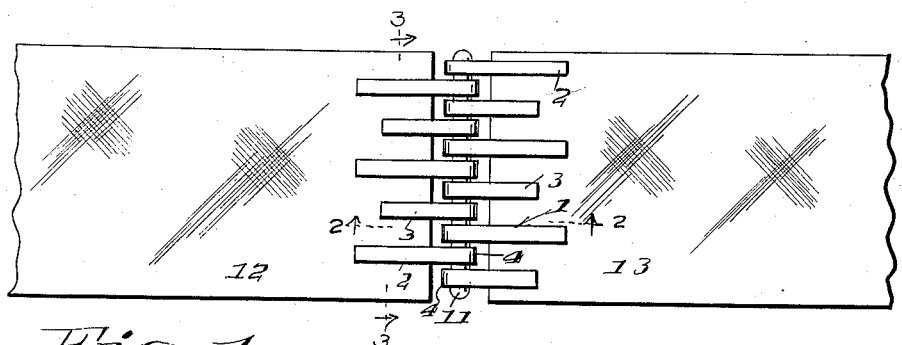
Figure 2:
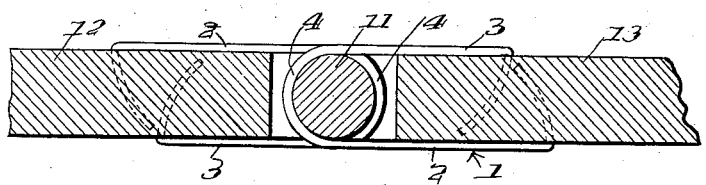
Figure 3:
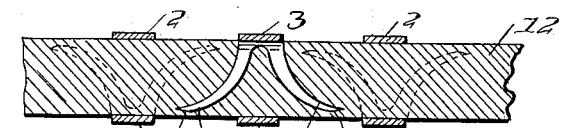
Figure 4:
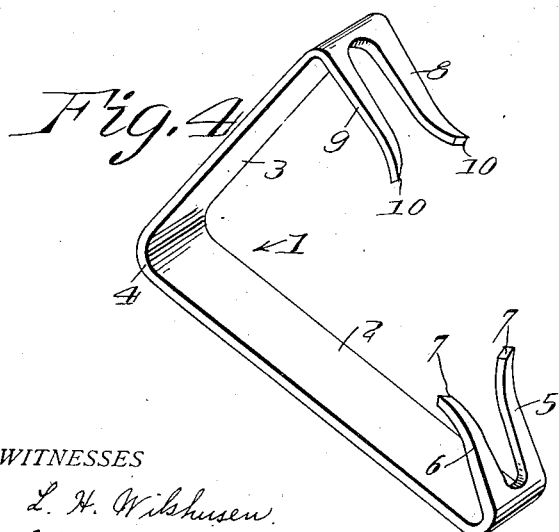
Figure 5:
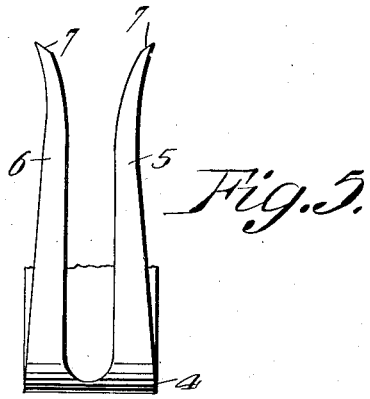

Figure 1 is a plan view of two belt ends united by my improved form of belt hook. Fig. 2 is an enlarged section as on the line 2—2 of Fig. 1. Fig. 3 is an enlarged section as on the line 3—3 of Fig. 1. Fig. 4 is a perspective view, on an enlarged scale, of one of the hooks. Fig. 5 is a face view of one of the hooks with a portion broken away.

Like numerals of reference indicate like parts throughout the several views.

Referring to the drawings, 1 designates the hook as a whole. It comprises a long arm 2 and a shorter arm 3 united by a curved bend or bight 4, as indicated in Figs. 2 and 4. The free end of the long arm 2 terminates in prongs 5 and 6, the points of which are made chisel shaped with the entering edges parallel to the arm, as seen at 7, said points curving slightly outwardly in their normal condition, as best seen in Fig. 5, the object of which will be made clear as the description proceeds. The free end of the shorter arm 3 is likewise provided with prongs 8 and 9 which terminate in similar chisel shaped points 10, the prongs 8 and 9 also curving slightly outwardly as will be obvious from an inspection of Fig. 4.

The prongs extend at an angle of 60° more or less from the arms so that when driven into the belt-end they will assume an inclined position toward the joint to insure a strong grip, as shown in Fig. 2. The hooks are disposed alternately in opposite directions to engage the belt-ends, the bends or bights 4 thereof being engaged about a hinge pin 11 of metal or other suitable material. As will be understood upon reference to Fig. 1, this hinge pin is disposed transversely of the length of the belt and when the hooks are applied as shown, the bends or bights 4 being disposed alternately upon opposite sides of the hinge pin, as seen in Fig. 2, and the hooks being of substantially flat material, form a good bearing on the pin allowing ease of movement and permitting the pin to be taken out easily when required. The hooks are arranged so that the long and short arms alternate on each face of the belt-end, the points lying in a zig-zag line across such end. The peculiar shape of the prongs, being slightly curved outwardly at the ends of the points and the points being chisel shaped, causes them to spread and to curl or clench as they are forced into the belt, the hooks when fully pressed in assuming the shape and position in which they are seen in Fig. 3. In applying the hooks to the belt, the opposite arms thereof embrace opposite sides of the belt-end and then pressure is applied in any suitable manner until the arms are brought flat against the opposite faces of the belt. As this is done, the chisel shaped points of the prongs enter the belt from opposite sides and are inclined inwardly toward the joint, and the points spread, as will be evident from Figs. 2 and 3.

As will be seen best in Fig. 4, the free ends of the prongs of each arm are curved outwardly in opposite directions so that when the prongs are forced into the material they extend in such a manner as to insure the most effectual holding of the prongs in the material and the belt ends together.

The prongs 5 and 6, and 8 and 9, are formed entirely in the bent portions of the arms beyond the bends, so that the openings thus formed do not extend into the body portions of the said arms, and thus weakening of the arms is obviated.

As will be clearly seen in Figs. 2 and 3 the prongs are embedded entirely within the material of the belt ends and are not visible from either side thereof.

Modifications in detail may be resorted to. The arms may be of different lengths and the material thereof may be of any required width.

What is claimed as new is:—

A belt hook having long and short arms with an intermediate curved bearing for engagement with a supporting hinge pin, said arms each terminating in prongs, said prongs being formed entirely within the bent portions of the arms beyond the bends thereof, the prongs of one arm extending substantially in a direction opposite to those of the other arm and toward the same, said prongs being in pairs and the pairs of prongs being normally curved slightly away from each other transversely, and the prongs of each pair having their terminals curved in opposite directions longitudinally.

In testimony that I claim the invention above set forth I affix my signature, in presence of two witnesses.

JAMES K. DIAMOND.

Witnesses:
  JOHN E. MORE,
  FRED M. CHAMPLIN.